United States Patent [19]

Arnett

[11] Patent Number: 5,004,910

[45] Date of Patent: Apr. 2, 1991

[54] METHOD OF DECODING ENCODED RELATIVE SPECTRAL DATA

[75] Inventor: Eric M. Arnett, South Bend, Ind.

[73] Assignee: Allied-Signal Inc., Morristown, N.J.

[21] Appl. No.: 389,481

[22] Filed: Aug. 4, 1989

[51] Int. Cl.$^5$ ............................ G01J 3/50; G01D 5/34
[52] U.S. Cl. ................... 250/226; 250/227.23; 250/231.18; 341/13
[58] Field of Search ............... 250/231.13, 231.18, 250/227.23, 226, 237 G; 341/13, 14, 70, 71, 73; 33/706-7; 356/373

[56] References Cited

U.S. PATENT DOCUMENTS

| | | | |
|---|---|---|---|
| 4,223,216 | 9/1980 | Quick et al. | 250/226 |
| 4,334,152 | 6/1982 | Dakin et al. | 250/231.18 |
| 4,350,973 | 9/1982 | Petryk, Jr. | 341/70 |
| 4,362,358 | 12/1982 | Hafle | 250/227.23 |
| 4,857,726 | 8/1989 | Kinney et al. | 250/227.23 |
| 4,868,569 | 9/1989 | Montgomery | 341/70 |
| 4,884,074 | 11/1989 | Nourry et al. | 341/70 |

Primary Examiner—David C. Nelms
Assistant Examiner—Michael Messinger
Attorney, Agent, or Firm—Leo H. McCormick, Jr.; Ken C. Decker

[57] ABSTRACT

A method of decoding spectral data that has been encoding by modulation of a spectrum of light to produce data bits from a source using on/off and off/on transitions to represent each data bit. A start data bit with a constant width precedes each segment of light representing the data bits. The intersection of the output of spectral detectors and a hysteresis curve determines a transition through which information is obtained from the encoded data.

4 Claims, 3 Drawing Sheets

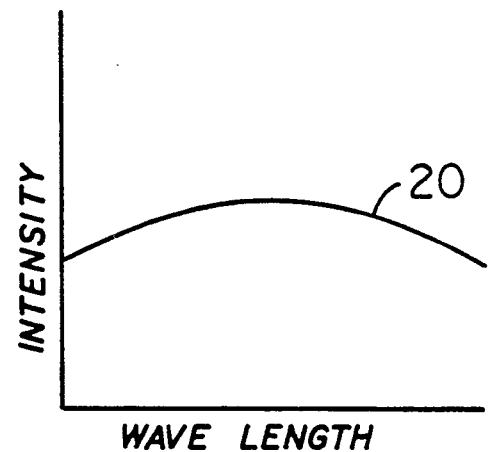
FIG. 2
FIG. 4
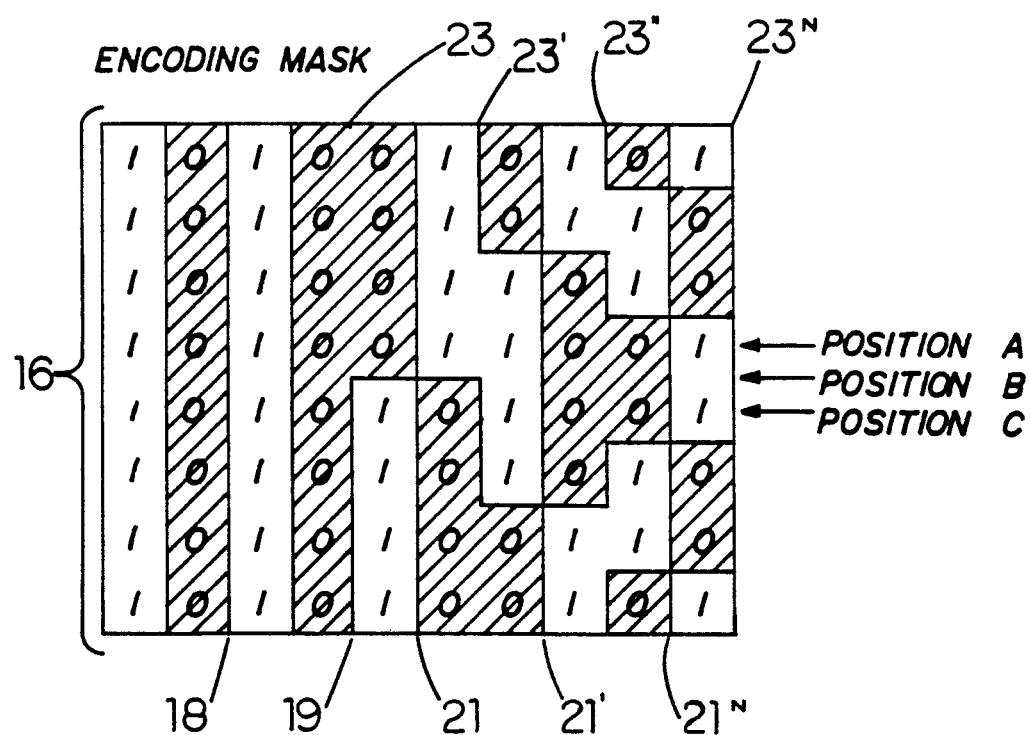
FIG. 3

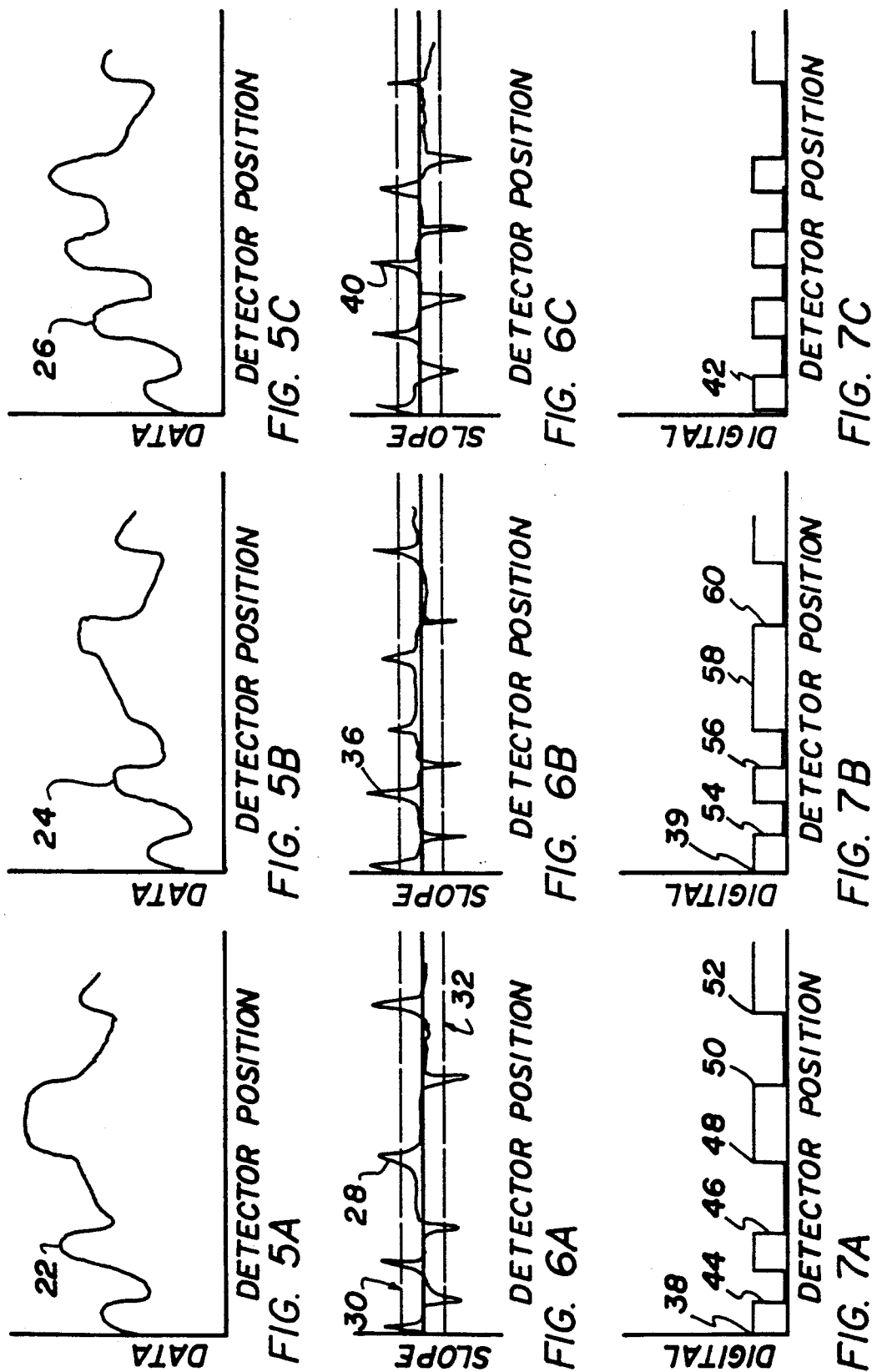

METHOD OF DECODING ENCODED RELATIVE SPECTRAL DATA

The invention relates to optical data signals processing methods of decoding a binary modulated light spectrum to recover intelligence encoded therein.

Commonly assigned and copending U.S. Pat. Nos. 4,233,261 and 4,778,270, disclose an optical spectrum analyzer and a spectral optic temperature sensor which utilize an ordinary wide band light beam as the transmitting medium for encoding and decoding data. The light beam is dispersed to generate an optical spectrum or individual elements of a modulated spectrum and are thereafter recombined into a beam of light. The recombined beam of light is again separated into its optical spectrum made up of modulated spectral elements. Thereafter, these individual spectrum elements are analyzed to recover the encoded intelligence. Typically, the spectral elements are transmitted or blocked as a function of an operational parameter such as position, temperature, speed, rotative torque, and etc.

In decoding data, the quantity of coded data typically monotonically increases and decreases as a function of the operational parameter increasing and decreasing. It has been discovered that the recovery of data can also vary as a function of temperature, dirt, electrical circuitry, mechanical and optical components associated with the encoding and decoding of the coded data. Further, excitation sources, such as light emitting diodes, exhibit changes in excitation magnitude as a function of the wave-length of the coded data. As a result when encoding an on/off binary state portions of the encoded spectrum, an "off-bit" may be larger in magnitude than an "on-bit" elsewhere in the coded data. This creates a difficult task in establishing threshold levels to be used with a binary level for any particular spectral element. Thus it is necessary to compensate for variations in spectral density.

U.S. Pat. 4,852,079 discloses a method of encoding and decoding relative spectral data. This method, while performing in an adequate manner imposes an intensive computational burden in decoding the encoded data.

The present invention discloses a simplified method for decoding relative spectrum data as a result of encoding data in the following manner: a fixed data or sync bit pattern is encoded immediately followed by the binary data under evaluation. The sync bit pattern can be encoded as two consecutive "on" bits and followed by spectral elements which are generated as "on/off" or "off/on" with respect to each data bit currently being decoded. That is, the binary 1 data would be represented as an "on" followed by an "off" and a binary 0 would be represented by an "off" followed by an "on" or vice versa. This type of encoding which utilizes transitions rather than levels is commonly referred as Manchester Encoding. The sync bit transition and length is used to determine if the first data bit is "on" or "off". The data is further coded such that only one data bit changes between any two adjacent positions in a manner similar to encoding through a method commonly referred to as Gray Code. It is noted that Gray Code does not require any extra data bits, that is 12 bits of data to be encoded, only 12 bits are required.

Once the data is encoded, it is decoded in the following manners: (1) determining the location of the falling edge of an initial start or sync bit pattern, the first encoded spectral data element, and a second or next sync bit transitions; (2) determining the expected position of the transition portion of the first data element based on predetermined expected length between the start bit transition position and the first data bit transition position; (3) finding the actual transition position and determining whether the data is raising or falling and then assigning a 0 or 1 value; (4) determining the next data element transition position based the first data element transition position; and (5) continuing the processes for each data spectrum element until the last data bit is reached. Should a data bit transition not occur in an expected position and the next data bit transition location is located and the missing bit is set to a 1 or 0, resulting in only a one half a bit error. However, if a second data bit transition in the same set is not detected, the data is no longer considered to be valid.

The broad spectrum is transmitted to the encoding elements by a fiber optic cable. The encoding process separates the spectral components and selectively transmits or blocks those components in accordance with the above described encoding method across the length of spectrum. Thereafter these encoded components are recombined in the fiber optic cable. The return spectrum is then focused onto an array of photo-detectors to develop electrical signals whose magnitude changes are proportional to the magnitude changes of the spectral components. Electrical magnitude curves are then processed to extract high/low and low/high transitions to determine coded data corresponding to the originally spectrally encoded data. The data is then decoded by inverting the coding process used for encoding the spectral data.

It is an object of this invention to provide a method of encoding data to simply the decoding of the data.

It is an object of the invention to provide a method for decoding relative encoded spectral data.

Another object of the invention is to provide a method which reduces the effect of an error introduced in encoding data.

A further object of the invention is to provide a method in which data spectrum is formed and segmented into a spectrum with clearly defined magnitude and spectral increments.

It is yet another object of the invention to provide a method which enables the accurate and reliable transition of coded spectral data.

Another object of the invention is to provide a method which enables the generation and transition of spectral data over a single optic fiber utilizing light emitted by light emitting diodes.

Yet another object of the invention is to provide a method of encoding and decoding data wherein each bit of binary data has both high and low level components with the relationship of high and low level determining if the data bit is a logic 0 or 1.

It is another object of the invention to disclose the method of encoding data by high/low level components in the arrangement of data such that only one data bit change states between any two adjacent positions.

Finally it is yet another object of the invention to provide a method of compensating for data variations in parameters of an optical system which may affect the apparent length of a data bit by continually updating the the length of an encoded pattern after a sync pattern.

BRIEF DESCRIPTION OF THE DRAWINGS

These and other objects and purposes of the invention will both be understood in view of the following detailed description of the invention taken in conjunction with the appended drawings wherein.

FIG. 2 is a multiaccess chart showing the relationship between encoded data or expected data as an example from, zero to seven, its binary equivalent, the coded value such that only one bit changes.

FIG. 3 is a code mask corresponding to the chart of FIG. 2 wherein on and off bits are represented as light and dark with always on and off start bits;

FIG. 4 is a chart showing an allowance for the excitation intensity changes for different wave lengths;

FIGS. 5(A), 5(B) and 5(C) are graphs showing typical outputs of spectral detectors for various positions of the encoding mask;

FIG. 6(A), 6(B) and 6(C) are graphs showing typical outputs for several data elements; and FIG. 7(A), 7(B) and 7(C) are graphs showing transition points for the various outputs.

DESCRIPTION OF PREFERRED EMBODIMENT

Figure 1:
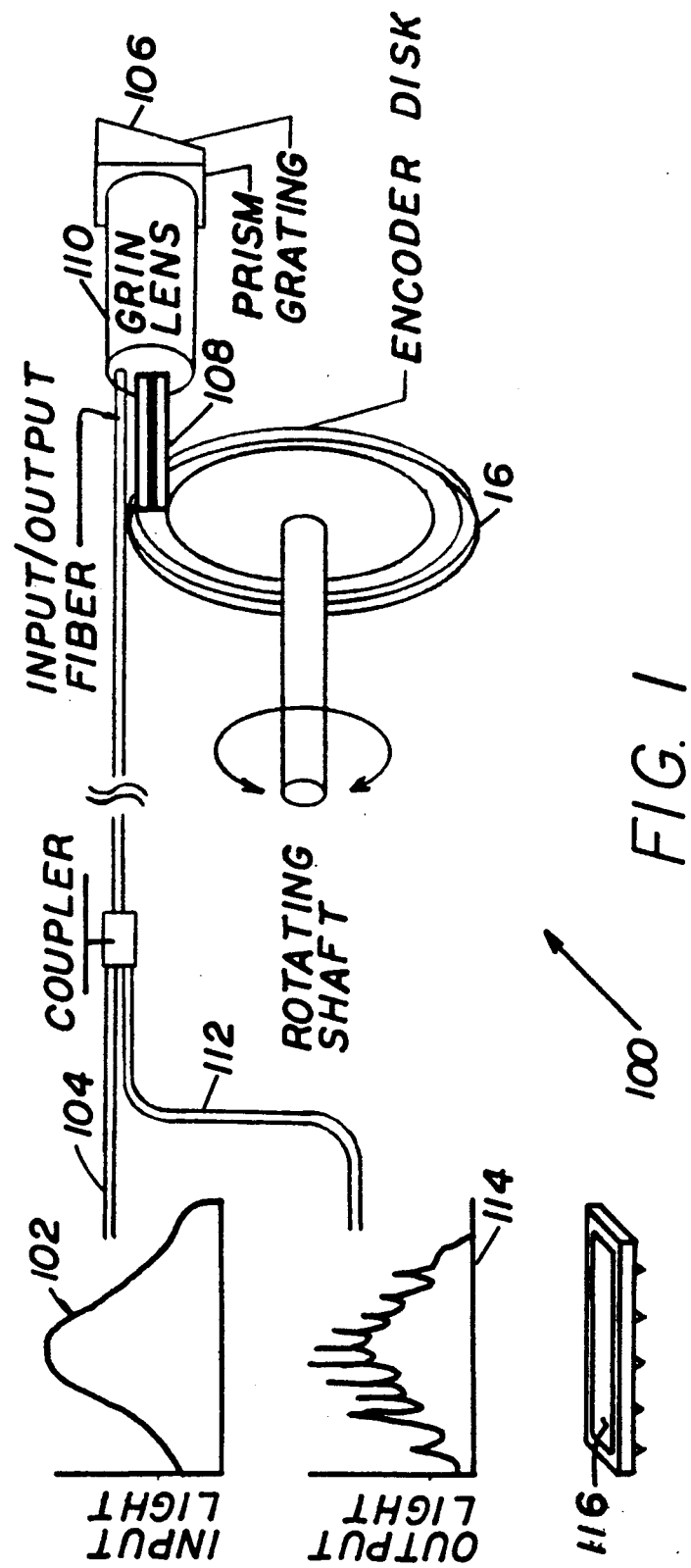
FIG. 1 is a block diagram of a typical data generation system for using the method of decoding the binary modulated light spectrum according to the present invention.

FIG. 1 illustrates a typical optical system 100 wherein spectral binary data is encoded through a excitation broad band spectrum light 102 and transmitted through a fiber optic cable 104 to a defraction grading prism 106 or other type of dispersing element to produce the spectrum of light 108. The light spectrum 108 is focused onto encoding mask 16 which defines relative on and off spectral data. The encoded spectrum is recombined through lens 110 used to disperse the excitation. This recombined spectrum data is then passed through fiber optic cable 112 to a remote location where it is then spread into its spectral elements 114 and focused onto an array of photo-detectors 116. The intensity of these spectral elements 114 is used to determine the encoded data representing the position of mask 16.

Referring to FIG. 2, element 10 shows a decimal equivalent of a three-bit binary data with magnitudes from zero through seven, element 12 is the binary equivalent of the data of element 10 and element 14 is the data coded in a manner wherein only one bit of data changes between any consecutive positions according to Gray Code. For example, in element 12 between state 3 and 4, three bits change state whereas in element 14 only one bit changes state.

Encoded mask 16 shown in FIG. 3 is used for encoding the coded binary data of element 14. "On" is clear and represented by a logic 1 while "off" is dark and represented by a logic 0. Each data element in this code begins with an optional sync pattern elements 18 and 19 of on/off followed by another on/off then followed by data elements which are included as off/on to represent a logic 0 in this example and on/off to represent a logic 1. Each data element has a transition in the center of the bit location, elements 21, 21', ... 21$^n$, and may or may not have a transition at the data edges, elements 23, 23', ... 23$^n$.

FIG. 4 is a curve 20 which illustrates an example of intensity spectrum versus wave-length of the excitation light 102.

Curve 22 of FIG. 5(A) illustrates spectral intensity versus wave-length across the encoded spectrum that may be expected from the sampling process when the relative position of the mask 16 is in position A of FIG. 3. Curve 24 in FIG. 5(B) is similar to curve 22 except the pattern is for position B of FIG. 3 and curve 26 in FIG. 5(C) represents the spectral pattern for position C.

The processed output for position A from the spectral detectors 116 is shown by curve 28 in FIG. 6(A). The intersection of curve 28 with a preselected positive hysteresis curve 30 represent the magnitude of a raising edges above a base line which will be assigned a logic 1 value while the intersection with a preselected negative hysteresis curve 32 represent the magnitude of falling edges below a base line which will be assigned a logic 0. The intersection points are represented as 1's or 0's depending on the state and remain constant until the next intersection where such data changes again. FIG. 7(A) is a continuous graph of curve 28 which identifies significant transition for position A.

Curve 36 in FIG. 6(B) represents the processed output for position B while curve 38 in FIG. 7(B) illustrates further processing of the curve 36 to identify the transition positions. Similarly position C is illustrated by curve 40 in FIG. 6(C) while curve 42 in FIG. 7(C) represents further processing of curve 40 to detect the transition positions.

In conjunction, with, hysteresis curves 30 and 32 shown in FIG. 6(A), 6(B) and 6(C), this invention also uses the falling edges of 44 and 46 shown in FIG. 7(A) the two start-bits 18 and 19 of FIG. 3 to determine the expected location of the next transition represented by rising edge 48 of encoded positions 21 on mask 16 in FIG. 3. The length or distance across the detector is measured between 44 and 46 and a window is determined where the rising edge 48 may be expected with consideration variations due to noise, etc. Such variations may be wide in a relative sense since only at position 50 of encoded positions 21' on mask 16 in FIG. 3 may the next data bit transition be expected. After the transition at element 48, the difference between 44 and 46 is used to determine the expected transition of position 50 based on the transition position of 48 and the difference between the positions 44 and 46. In the case of curve 36 shown in FIG. 6(B), positions 54 and 56 shown in FIG. 7(B) the length difference is used to determine the expected position of position 58. However, position 58 shows no slope change and therefore the state of the data, logic 1 or 0 cannot be determined. As a result in order to determine position 60, the length between positions 54 and 56 is used rather than the length between positions 56 and 58. At most, only one data bit in the pattern is allowed to be missing. However this data can either be assumed to be 1 or 0 without incurring significant error in the output.

This invention discloses that by using a relative change based on the slopes of the spectral intensity computations are much simpler and reduces the number of possible errors. Likewise, this method allows for variation in the apparent length of the encoded spectrum since the distance between the start bit falling edges such as 44 and 46 or 54 and 56 is measured and its consistency is known to be constant through data lengths 48, 50, 52, ... etc. This method of encoding may be extended for any number of data bits as required, to meet the required accuracy or resolutions.

The start bit pattern 18 and 19 shown in FIG. 3 is represented by the edges 44 and 46 may not necessarily need to be a 1010 but could be the inverse. Likewise, in systems where less spectral width or variations are found, only one start bit 18 may be necessary eliminating start bit 19 in the code pattern of mask 16. Also, the slope, detection pattern as illustrated in FIGS. 7(A), 7(B) and 7(C) could be modified by filtering the detector output shown in FIGS. 6(A), 6(B) and 6(C), respectively to remove the excitation bias and thus retain the data shape.

The primary requirement for this method of encoding and decoding is that the slope expected between the adjacent on/off elements is greater than the slope of the excitation spectrum.

What I claim is:

1. A method of decoding a relative spectrum data for a plurality of positions that have been encoded by a wave length multiplexer sensor, said method comprising the steps of:

generating a spectrum of light having at least a predetermined band-width, said spectrum being made up of segments of a plurality of individual bits;

modulating the individual bits of said spectrum to produce a modulated spectrum having data bits derived from on/off and off/on transitions relating to a plurality of adjacent data bits, said modulated spectrum having a start data bit with a constant width which precedes each segment of the spectrum of light represented by said data bits, said start data bit being identified by an always on field followed by an always off field; and locating the center of each data bit through a transition edge to determine the difference between adjacent data bits and thereby determining the location of the next transition edge in the plurality of data bits.

2. A method of decoding relative spectrum data for plurality of positions that have been encoded by a wave length multiplexer sensor, said method comprising the steps of:

generating a spectrum of light having a least a predetermined band-width, said spectrum being made up of segments of a plurality of individual bits;

modulating said individual bits of said spectrum to produce a modulated spectrum having data bits derived from on/off and off/on transitions of a plurality of adjacent data bits, said modulated spectrum having a start data bit with a constant width which precedes each segment of said segments in the spectrum of light represented by said data bits, said start data bit being identified by a first data bit defined by a first on/off transition followed by a second data bit defined by a second on/off transition to measure a time period between said the first and second bits, said time period forming a basis to approximate on/off and off/on transitions for subsequent data bits in said plurality of adjacent data bits; and identifying a transition edge located in the center of each data bit to measure a difference between adjacent data bits to thereby determining the location of a next transition edge in said plurality of data bits.

3. The method of claim 2 wherein the step of modulating the individual bits includes the step of:

changing a single data bit as the sensor moves between adjacent positions in said plurality of positions.

4. The method as recited in claim 3 wherein the step of modulation further includes the step of:

disregarding data when an expected on/off or off/on transition does not appear and continue to use the preceding transition to approximate the subsequent transition.

* * * * *